May 1, 1934. T. W. ERICKSON 1,957,162

PORTABLE WATERPROOF MANHOLE RIM

Filed May 19, 1933

Inventor

T. W. Erickson

By Mason Fenwick & Lawrence
Attorneys

Patented May 1, 1934

1,957,162

UNITED STATES PATENT OFFICE 1,957,162

PORTABLE WATERPROOF MANHOLE RIM

Thomas W. Erickson, Norfolk, Va.

Application May 19, 1933, Serial No. 671,936

7 Claims. (Cl. 94—38)

The subject matter of this application is rim, preferably cylindrical, adapted to be secured to and surround a manhole to prevent seepage of surface water through the manhole into the conduit or chamber provided therewith.

The main object of the invention is to provide a device of the character described, which can be very cheaply manufactured, and which can be very quickly secured to or detached from a manhole to prevent surface water seeping on to men working in the conduits or mains to which access is provided by the manhole.

Other objects of the invention will become apparent as the detailed description thereof proceeds.

Figure 1:
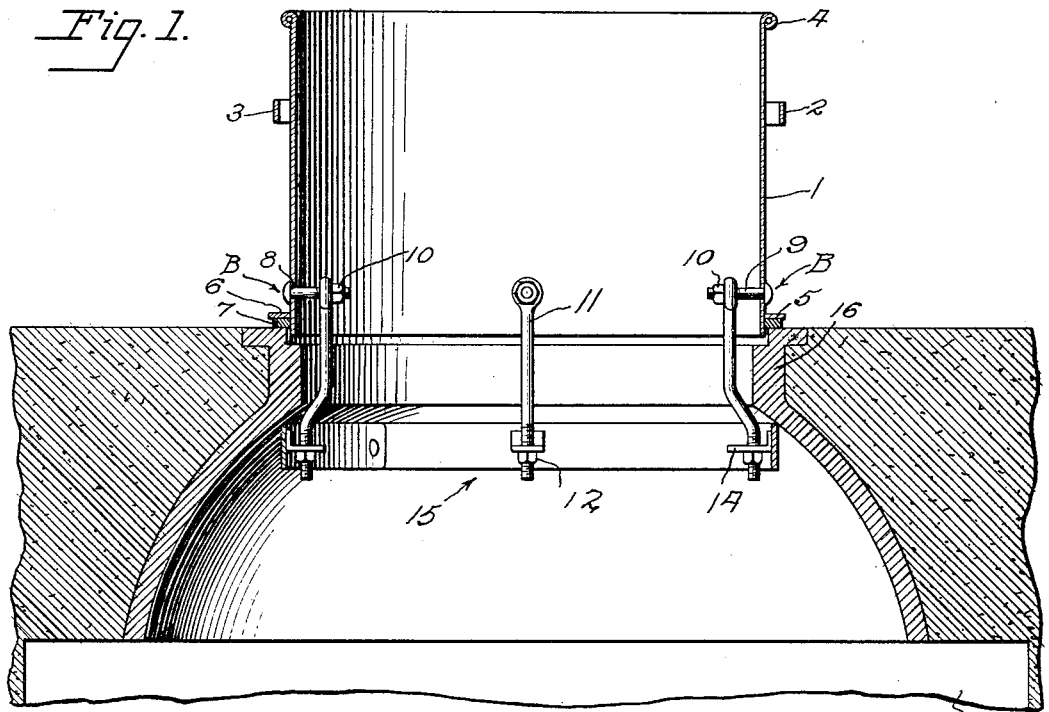
Figure 1 is a fragmentary vertical section through a man hole having the portable rim of the present invention applied thereto.
Figure 2:
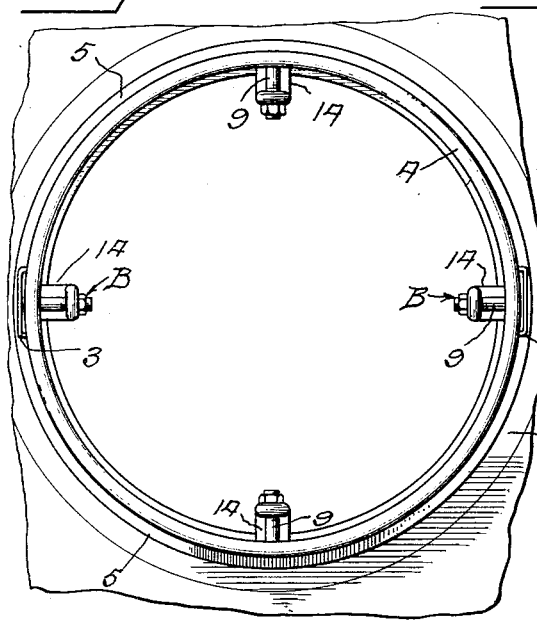
Figure 2 is a top plan of the rim shown in Figure 1.
Figure 3:
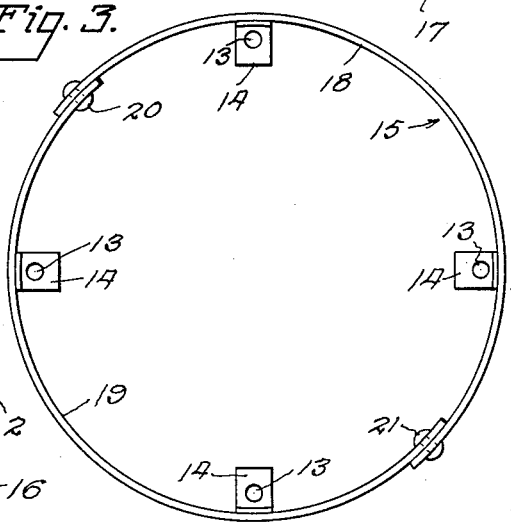
Figure 3 is a plan of a foldable securing ring forming part of the said invention.

As shown in the drawing, the invention comprises a manhole guard or rim 1 which is preferably cylindrical but may have any other desired shape in cross section so long as it conforms substantially to the shape of the manhole to which it is intended to be applied. This guard is provided with handles 2 and 3, conveniently arranged at diametrically opposite points on the outer surface thereof, to facilitate lifting and transporting the guard or rim from one location to another. The upper end of the guard is turned on itself to form a bead 4; and a flange 5 is suitably secured to the guard near the lower edge thereof to form a recess 6 adapted to form a seat for a gasket 7 of resilient material.

Some little distance above the flange 5, the guard 1 is provided with a plurality of apertures 8 through which pass the shanks 9 of bolts B which extend radially toward the axis of the guard 1. These bolts B are provided with the usual nuts 10 to limit the sliding movements on the shanks 9 of a series of eye-bolts 11 which are mounted on the shanks 9 and depend therefrom through the lower open end of the guard 1.

The eye-bolts 11 have their lower ends screw-threaded to receive the nuts 12, and these ends pass freely through apertures 13 formed in angle iron brackets 14 suitably secured to the inner surface of a clamping ring 15. This ring 15 is used in conjunction with the eye-bolts to clamp the guard 1 firmly against the upper edge of a dome-shape lining 16 for a manhole giving entrance to a chamber 17. The clamping ring 15 is formed of two parts 18 and 19, each of which is shaped as an arc of a circle slightly greater than a semi-circle. The ends of the part 18 slightly overlap the ends of the part 19; and these overlapping ends are pivotally connected to each other by means of the headed pivots 20 and 21.

As shown in the drawing, the clamping ring 15, when unfolded must be greater than the diameter of the manhole so that when properly secured and adjusted on the guard 1 it will engage the inner surface of the lining 16 and at the same time it will be sufficiently large to permit the body of a person to pass freely into the chamber 17 communicating with the manhole. Since the clamping ring 15 is of greater diameter than the diameter of the manhole, it is necessary that it be made foldable in order to permit its insertion into clamping position. The operation of the device will be apparent to persons skilled in the art from inspection of Figure 1 of the drawing.

It will be apparent that the guard 1 operates as a species of rim for the manhole. When it is firmly clamped in position it acts as a projecting flange to prevent seepage of surface water into the manhole.

It must be understood that the invention is not limited to the precise details of construction shown in the drawing, as many of the elements may be varied in shape, or replaced by other elements performing the same or similar functions, without departing from the spirit of the invention, the scope of which is defined in the claims appended hereto.

What I claim is:

1. A portable manhole guard comprising: an open ended cylindrical casing, pins projecting radially from and angularly spaced apart around the inside of the casing, a clamping member, and means connecting said member to said casing for adjustment toward and from one end thereof.

2. A portable manhole guard comprising: a cylindrical open ended casing, a clamping ring of substantially the same diameter as that of said casing and coaxial therewith, and means for detachably and adjustably connecting said ring to said casing.

3. A portable manhole guard comprising: a cylindrical open ended casing, a clamping ring of substantially the same diameter as that of said casing, a flange surrounding said casing near one end thereof, a gasket seated in the recess formed by said flange, a plurality of pins projecting inwardly from said casing near the flanged end thereof, eye-bolts suspended from said pins, brackets projecting inwardly from said ring, and means for adjustably connecting the lower ends of said eye-bolts to said brackets.

4. A portable manhole guard comprising: a cylindrical open ended casing, a clamping ring of substantially the same diameter as that of said casing, a plurality of bolts pivotally connected to and angularly spaced apart around the interior of said casing, and means for adjustably connecting the lower ends of said bolts to said clamping ring.

5. A portable manhole guard comprising: a cylindrical open ended casing, a clamping ring of substantially the same diameter as that of said casing, a flange surrounding said casing near one end thereof, a gasket seated in the recess formed by said flange, a plurality of pins projecting inwardly from said casing near the flanged end thereof, eye-bolts suspended from said pins, brackets projecting inwardly from said ring, and means for adjustably connecting the lower ends of said eye-bolts to said brackets, said clamping rings comprising parts pivotally connected to each other whereby one part may be folded within the other when disconnected from said bolts.

6. A manhole having a guard rim surrounding and positioned on one side thereof, a clamping ring positioned at the other side of said manhole, and adjustable means connecting the clamping ring to the guard rim for detachably securing said guard rim in position around said manhole.

7. A manhole having a guard rim surrounding and positioned on one side thereof, a clamping ring positioned at the other side of said manhole, and adjustable means connecting the clamping ring to the guard rim for detachably securing said guard rim in position around said manhole, said clamping ring comprising sections foldable one within the other when disconnected from said adjustable means.

THOMAS W. ERICKSON.